(12) United States Patent
Appleyard

(10) Patent No.: US 6,357,313 B1
(45) Date of Patent: Mar. 19, 2002

(54) ELECTRIC POWER STEERING COMPRISING A WORM GEAR

(75) Inventor: Michael Appleyard, Chorley (GB)

(73) Assignee: TRW LucasVarity Electric Steering Ltd., West Midlands (GB)

( * ) Notice: Subject to any disclaimer, the term of this patent is extended or adjusted under 35 U.S.C. 154(b) by 0 days.

(21) Appl. No.: 09/486,308
(22) PCT Filed: Aug. 28, 1998
(86) PCT No.: PCT/GB98/02594
  § 371 Date: May 1, 2000
  § 102(e) Date: May 1, 2000
(87) PCT Pub. No.: WO99/11502
  PCT Pub. Date: Mar. 11, 1999

(30) Foreign Application Priority Data
Sep. 3, 1997 (GB) ............................................. 9718574

(51) Int. Cl.[7] .............................. F16H 55/24; B62D 5/04
(52) U.S. Cl. ...................... 74/388 PS; 74/425; 384/255
(58) Field of Search ............................ 74/388 PS, 425; 384/255

(56) References Cited

U.S. PATENT DOCUMENTS

| | | | |
|---|---|---|---|
| 3,220,277 A | | 11/1965 | Dixon |
| 4,586,393 A | * | 5/1986 | Mooney et al. ................ 74/396 |
| 5,834,662 A | * | 11/1998 | Stoll et al. ..................... 74/425 |
| 5,957,000 A | * | 9/1999 | Pecorari ........................ 74/425 |
| 6,044,723 A | * | 4/2000 | Eda et al. ............... 74/388 PS |

FOREIGN PATENT DOCUMENTS

| | | |
|---|---|---|
| EP | 0270159 | 6/1988 |
| EP | 0520131 | 4/1991 |
| EP | 0627352 | 12/1994 |
| EP | 0748735 | 12/1996 |
| FR | 2375572 | 7/1978 |
| GB | 2155583 | 9/1985 |
| JP | 61-211558 | * 9/1986 |
| JP | 526330 | 2/1993 |
| JP | 7237551 | 9/1995 |

* cited by examiner

Primary Examiner—David Fenstermacher
(74) Attorney, Agent, or Firm—Tarolli, Sundheim, Covell, Tummino & Szabo L.L.P.

(57) ABSTRACT

Apparatus for removing the backlash and free-play present between a worm (8) and worm wheel (10) in the gearbox of an electric power assisted steering system is disclosed. The worm (8) is provided on an output shaft (6) from an electric motor (4) and the wheel is provided on another separate shaft (9) (possibly the steering column). The wheel is fixed relative to a housing (1), and the worm is fixed relative to the housing through at least a first and a second support assembly (100, 200). The first support assembly (100) is provided at the end of the output shaft (8) distal from the motor (4) and comprises an eccentric bush (101) which can be rotated to adjust the radial position of the output shaft and hence worm gear. The second support assembly (200) allows for angular movement of the output shaft (6). The first support assembly (100) may be manually rotated or may automatically rotate under a spring force to adjust the amount of free-play.

19 Claims, 3 Drawing Sheets

ELECTRIC POWER STEERING COMPRISING A WORM GEAR

This invention relates to improvements in apparatus for eliminating or reducing backlash and/or freeplay between a pair of meshing gears, and in particular between a worm gear and a worm wheel in an electric power assisted steering system.

It is known in the art to provide an electric power assisted steering system of the kind in which an electric motor applies an assistance torque to a steering column in response to a measure of the torque applied to the steering column by the driver of a vehicle. The motor acts upon the steering column through a worm gear and wheel gear with the worm gear being provided on an output shaft of the motor and the wheel being provided on a driven shaft which may comprise a portion of the steering column. The worm and wheel act as a reduction gearbox between the motor and the driven shaft. Such a system will hereinafter be referred to as being "of the kind set forth".

EP-A-420131 shows an electric power steering system having the features of the pre-characterising portion of claim 1.

EP-A-270159 shows a system for automatically taking up play in a worm gear, the system comprising a compression spring.

A problem with known steering systems of the kind set forth, particularly where the driven shaft comprises a section of the steering column shaft, is that any free play (backlash) between the teeth of the worm and the teeth of the wheel can result in intermittent knocking noises upon torque load reversal. These noises can arise both as a result of variations in the level or torque applied by the motor and also due to movement of the steering column shaft due to the actions of the driver and vibration in the steering rack due to imperfections in the road surface or poorly balanced road wheels.

The problem of noise and knocking due to backlash, has, in practice been found to be significant even at quite low levels of backlash. For example, backlash can cause a problem even at levels as low as 0.015 mm, whereas the lowest tolerance range for backlash that can typically be achieved during production assembly (without individual piece-by-piece adjustment) is around 0.50 mm. In addition, it is known that backlash may increase during use of the system due to wear, by approximately 0.05 mm. This is noticeable when plastic gears are used to reduce friction weight and cost. Metallic gears would provide an increased resistance to wear but would not be able to provide the low friction levels and tolerance of marginal lubrication needed to ensure that the unit remains back drivable over its working life.

An object of the present invention is therefore to provide a means of overcoming, at least partially, the problem of backlash within the gears between the worm gear and the wheel gear.

According to our invention in an electric power steering system of the kind set forth, the motor output shaft which incorporates a worm gear is supported within a housing by at least two support assemblies spaced axially along the output shaft, a first one of said support assemblies including means to allow radial displacement of an end of the output shaft relative to the wheel gear whilst the other support assembly is adapted to allow angular displacement of the output shaft relative to the housing, characterised in that the first support assembly comprises a bearing assembly supported in an opening or recess provided eccentrically within a bush.

The provision of the support assemblies is advantageous because by allowing radial displacement of at least one end of the output shaft, the spacing between the worm gear and worm wheel can be varied. This allows the free play and backlash in the gearset to be adjusted.

The wheel gear may have a fully-throated or half throated tooth form in which the throat radius is substantially greater than (i.e. "non-conformal" with) the radius of the worm. Thus, a relatively large degree of variation in the positioning, axially, of the wheel gear relative to the worm gear can be tolerated without producing large changes in backlash and free play—whilst only a small change in the radial displacement between the worm gear and the wheel gear produces a useful change in backlash levels.

An advantage of the non conformal throat form is that it is easier to machine than a conformal throat form because it allows a larger diameter of hob and a more advantageous shape for the cutting teeth.

Preferably, the first one of said support assembles support the output shaft substantially at its free end, i.e. the end furthest from the electric motor. The other support assembly preferably supports the output shaft at a point in between the motor assembly and the worm gear, perhaps approximately midway along the output shaft.

Preferably, the motor output shaft, worm gear and the worm wheel on the steering column shaft are all provided at least partially within a single common housing.

The bush may be located in an opening or recess in the housing. Because the bearing is mounted eccentrically in the bush, rotation of the bush about its centre of rotation causes radial displacement of the output shaft relative to the housing at least where it passes through or enters the bush.

Where the output shaft is supported in at least two support assemblies and the first one is adjusted to provide radial displacement of the shaft, the angle at which the output shaft will pass through the other support assembly will vary. Accordingly, the other support assembly is adapted to allow a degree of angular displacement.

The first support assembly may be manually adjusted to facilitate the radial displacement of the output shaft. For example, the bush may incorporate a flange portion which is secured to the housing. The flange portion may be secured by one or more bolts or screws which pass through elongate openings in the flange. The openings allow the flange (and hence the eccentric bush) to be rotated manually relative to the bolts when the bolts arc loosened. Once the correct position is achieved the bolts (or screws or the like) may be tightened to fix the flange securely in place.

In an alternative arrangement, the first support means may be adapted to automatically adjust during use to displace the output shaft radially. This could, for instance, allow the shaft to be moved automatically to maintain the free play and/or backlash at a desired level.

The automatic adjustment means may comprise a compliant member which is adapted to apply a load between the output shaft and the worm wheel through the worm gear. The load may be of a fixed value or may be adjustable. The compliant member may comprise a tension spring or a compression spring. The spring may be linear or non-linear, ie a clock spring.

The compliant member may be adapted to exert a force between the housing and the eccentric bush which tends to rotate the bush. The rotation is resisted by the force of the worm gear acting upon the worm wheel. The force exerted by the compliant member is preferably chosen so that friction between the parts of the support means and the housing is overcome.

The second support assembly may comprise a first plate and a second plate which clamp a bearing race therebetween. Each plate may include one or more raised protrusions which clamp the center race of the bearing assembly. Most preferably, each plate has a central bore through which the output shaft can pass and a pair of diametrically spaced protrusions either side of the bore facing the bearing assembly when clamped. The bearing assembly is preferably clamped over substantially its control third portion only by the protrusions so that it can "tilt" or pivot about the protrusions. Thus, a degree of angular rotation of the bearing races is possible which allows small tolerance bearings to be used.

The protrusions may be hardened pads, and the bearing races may have a high axial stiffness to prevent excessive uneven loading of the ball bearings in the horizontal plane when axial forces act on the bearing.

An advantage of the automatic adjustment means is that it eliminates substantially the need to manually adjust the position of the output shaft during use, allowing wear in the gearset to be automatically corrected.

In addition the automatic adjustment means, a manual backup may also be included to enable fine adjustment of the output shaft position to be achieved.

There will now be described, by way of example only, two embodiments of the present invention with the aid of the accompanying drawings, in which.

Figure 1:
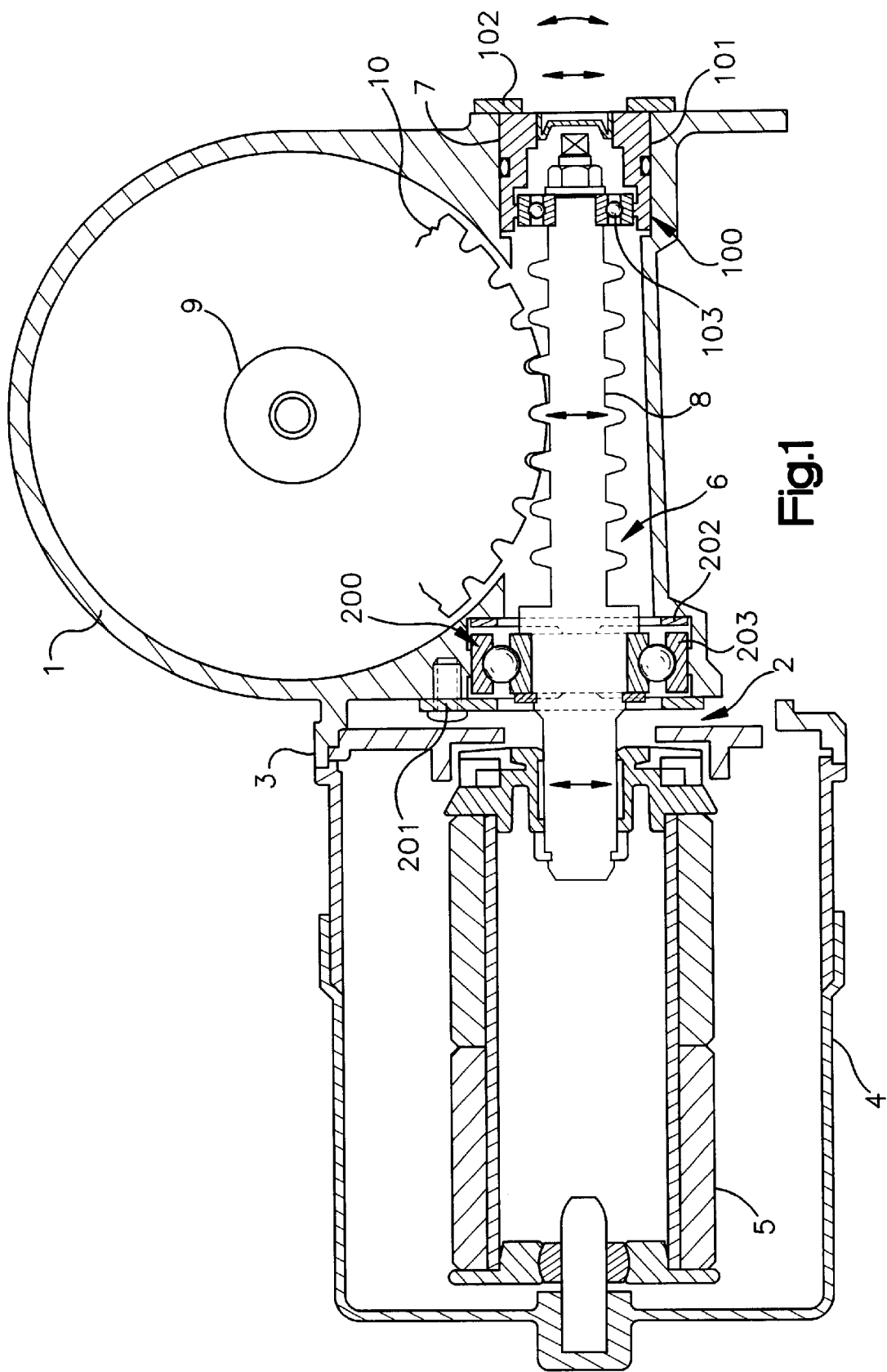
FIG. 1 is a cross section view of an electric power assisted steering assembly which includes output shaft support assemblies.

The operation of the support means of the invention will be explained by way of example. FIG. 1 is an illustration of the component parts of a typical electric power steering system. The system comprises a one piece housing 1 having an opening 2 surrounded by a locating flange 3 upon which a housing 4 for an electric motor is secured.

The motor housing 4 supports a motor stator (not shown) and a motor rotor 5 is supported within the stator. An output shaft 6 which extends at least partially through the motor is attached to the rotor 5 and extends through the opening 2 into the housing 1. Operation of the motor causes the rotor 5, and in turn the output shaft 6 to rotate. The output shaft 6 has a worm gear 8 defined along an intermediate portion.

The output shaft 6 is supported by two support assemblies 100,200. A first support assembly 100 is provided at the free end of the output shaft 6 distal from the motor and is located in an opening 7 of the housing 1 so that it can be accessed from outside the housing. The second support assembly 200 is provided to support the output shaft 6 at a point between the motor rotor and the worm gear 8. A driven shaft 9 extends through the housing 1 orthogonal to the output shaft 6 and supports a wheel gear 10 having a conformal tooth form. The driven shaft 9 is supported within the housing 1 through fixed bearings (not shown) so that it can not be displaced radially relative to the housing. It is held in a position whereby the wheel gear 10 meshes with the worm gear 8 on the output shaft.

Figure 2:
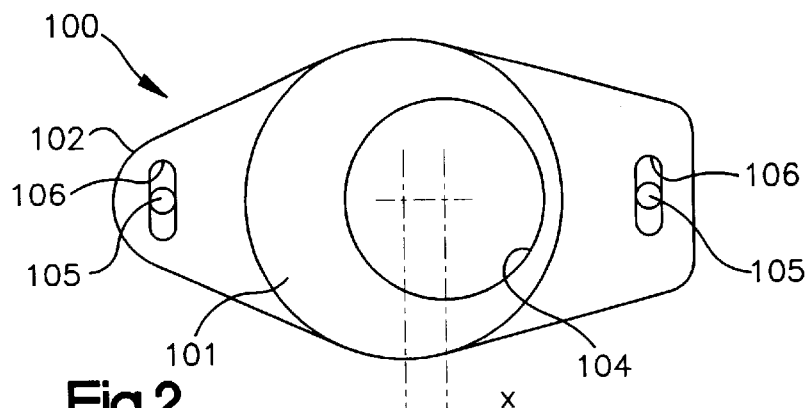
FIG. 2 is an end view of a first support assembly which supports the free end of the output shaft of FIG. 1 relative to a housing and allows manual adjustment of output shaft radial position.

The first support assembly 100, comprises an eccentric bush 101 having a flange 102 welded into one end. The outer perimeter of the bush 101 is cylindrical and it is adapted to be located within the cylindrical bore 7 in the housing 1 so that the flange 102 abuts an outside face of the housing 1. The free end of the output shaft 6 is supported by a bearing assembly comprising a bearing 103 which is press fitted within an eccentric circular bore 104 in the bush 101. The bearing 103 is fitted so that it is eccentric to the outside circumference of the bush 101 as shown in FIG. 2.

The outside perimeter of the bush 101 is chosen to be circular so that it can be rotated within the bore 7 in the housing. Of course, it does not need to be circular, and any shape which permits at least a range of rotation of the bush 101 relative to the housing 1 would be acceptable. The bush 101 is secured in position by bolts 105 which pass through elongated slots 106 in the flange. The length of the slots 106 in this case determines the maximum permissible amount of rotation of the bush 101 within the bore 7. Because the flange 102 is located on the outside of the housing 1, it is trivial to alter the position of the flange 102 during use by loosening the bolt, rotating the bush and retightening the bolts 105.

As described hereinbefore, the output shaft 6 is located through a bearing 103 within the first support assembly 100 so that rotation of the bush 101 produces a radial displacement of the worm gear 8 which allows backlash to be adjusted.

The second support assembly 200 is adapted to allow a degree of angular adjustment of the output shaft 6 to accommodate angular misalignment which occurs when the worm gear is radially displaced. The second support assembly 200 comprises a first plate 201 and second plate 202 which clamp either side of a bearing assembly 203 through which the output shaft 6 passes. The plates 201,202 incorporate raised protrusions 210 which are adapted to clamp the outer race of the bearing assembly at its middle third portion only, the bearing being able to "tilt" or pivot around the raised portions. Thus, tight clearance bearings can be employed without causing problems due to out-of-alignment running.

The operation of the adjustment of the backlash and freeplay will now be explained. By way of example, consider that the reduction ratio of the gearset is typically between 12 and 20:1. For this example assume that it is in fact 16.5:1. Further, assume that the PCD (pitch circle diameter) of the gear wheel is 92.7 mm and the tooth pressure angle $\alpha$ is 14°. The PCD of the worm is 15.2 mm.

The effect of radial movement of the teeth relative to the corresponding female slot is governed by the pressure angle of 14° according to $2 \times \tan 14° \approx 0.5$. Hence, 0.2 mm radial adjustment of the worm teeth (i.e. output shaft) will cause a 0.1 mm change in backlash. As described hereinbefore, the maximum backlash which may typically be encountered is 0.1 mm. Thus, to remove all backlash during the life of the system a radial movement of the tooth meshing point of 0.2 mm (i.e. ±0.1 mm total) is required. Hence, a total of 0.4 mm radial adjustment is needed at the first support end of the output shaft. This can be achieved by approximately +/−0.2 mm adjustment of the position of the bearing supporting the output shaft at the first support end. For a typical arrangement this in turn produces a +/−0.05 mm radial displacement of the output shaft at the motor end which is quite acceptable for the running of the motor.

The angular rotation of the worm shaft due to this adjustment range is estimated at ±0.115°, which is accommodated by the second support means which allows small angular misalignment. If no range of misalignment is provided at the second support, for instance by using small tolerance bearings in a fixed support, the bearings would rapidly deteriorate.

To provide for the range of adjustment required, the first support means comprises a cylindrical bush 101 having an eccentric hole into which an output shaft support bearing assembly 103 is located. The bearing 103 is located approximately 2 mm off centre (ie eccentricity x=2 mm), and the bush 101 is initially aligned so that rotation of the bush 101 causes maximum vertical displacement (desirable) of the output shaft with minimal horizontal displacement (undesirable). The flange is provided with slots which allow approximately ±6° of rotation to provide for the full amount of adjustment required.

Figure 3:
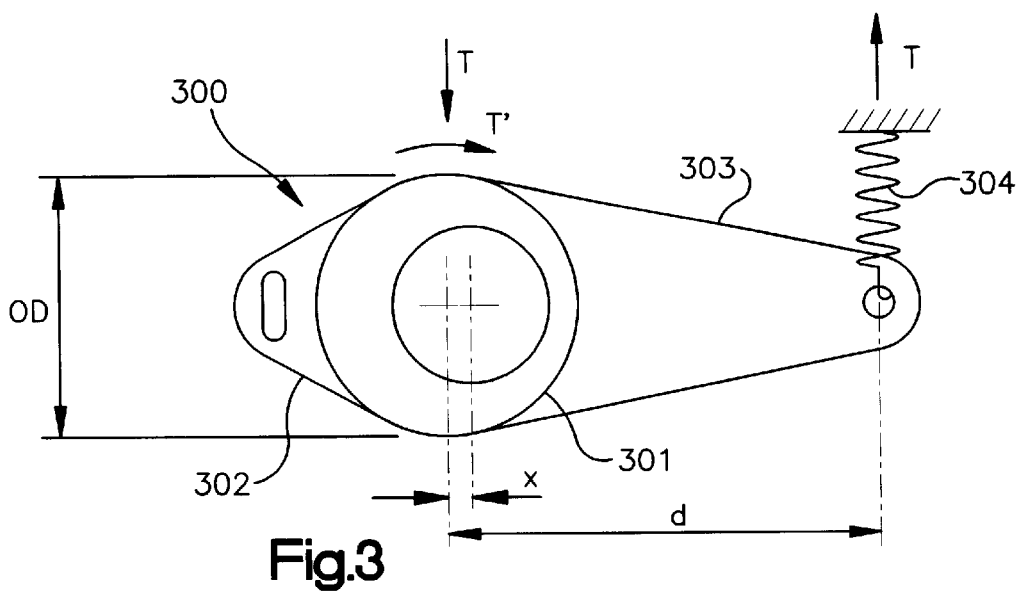
FIG. 3 is an end view of an alternative first support means which allows automatic adjustment of the output shaft radial position.
Figure 6:
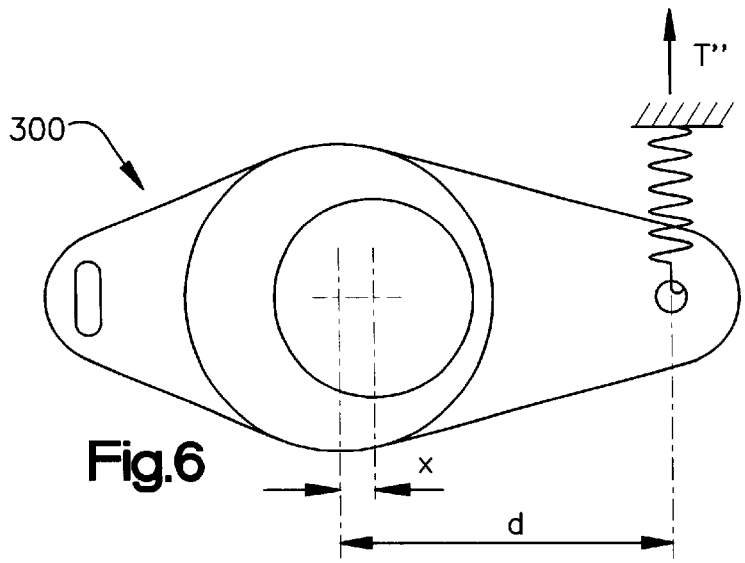
FIG. 6 shows an alternate arrangement to that shown in FIG. 3.

In modification, shown in FIGS. 3 and 6, first support assembly 300 comprises a bush 301 with a flange 302 in which a portion 303 of the flange 302 is extended radially to define a "lever arm". A complaint member 304 such as a tension spring is connected between the lever arm 303 and a part of the housing 1. Whereas in the first embodiment the position of the flange 101 was fixed relative to the housing by bolts, in this modification the flange 302 is free to rotate under the force of the tension spring. This allows the radial position of the output shaft to be automatically adjusted in use.

The spring force T must be chosen correctly to eliminate free play without increasing wear of the gearset due to excessive force between the worm gear and wheel gear.

For example, consider that the distance d between the centre of rotation of the bush 301 and the point on the lever arm 303 at which the spring 304 is attached is 40 mm, and the outside diameter OD of the bush is 28 mm. The forces acting on the bush 301 due to the spring when no force is exerted by the gearset are shown in FIG. 3.

The force T of the spring acting via the lever of 40 mm applies T×40N-mme torque to the bush. Assuming a coefficient of friction between the bush and housing of 0.3, this force is resisted by a force $T^1$ of T×0.3 acting at a distance of 14 mm. Thus, the net turning force on the bush is approximately 36×TN.mm which causes the worm to fully engage with the flanks of the teeth of the wheel gear. This is shown in FIG. 4.

Figure 4:
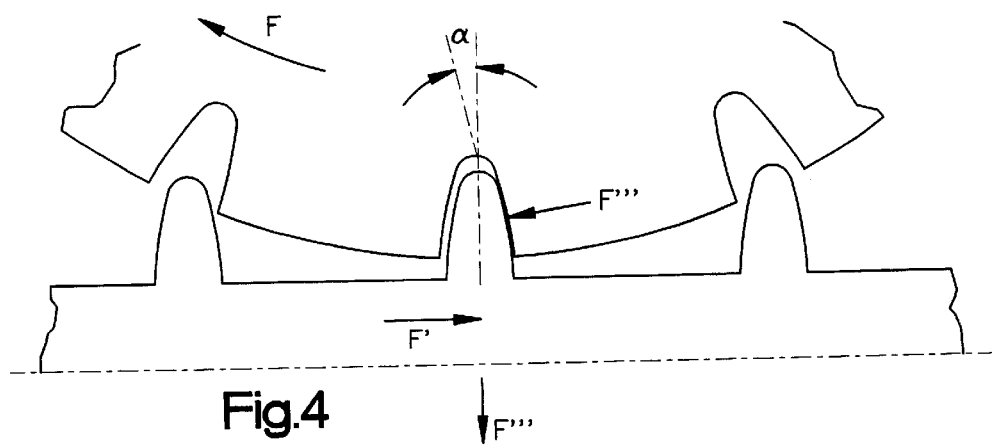
FIG. 4 shows the forces acting between the teeth of the worm gear and the worm wheel.

Next, assume that a force F is applied to the gear wheel, for instance as the steering column is rotated by a driver as shown in FIG. 4. If this force is, say, 42000 N-mm, a tangential force $F^1$ of 890N occurs at the gear pitch circle radius (46 mm). This results in a gear separating force $F^{11}$ of 890×tan 140=222N, resisted by a frictional sliding force $F^{11}$ between the teeth of (1/cos 140×sin 140×0.05)=11N (where 0.05 is the coefficient of friction between a plastic gear and a lubricated steel worm). The actual separating force $F^{11}$ is thus 211N.

The vertical reaction force at the outside diameter of the eccentric bush 301 is approximately 105.5N which causes a turning force on the bush of 2×105.5N=211N.mm and also a resistance to turning due to the frictional force between the bush 301 and the housing 1 (=105.5×0.3≈33N) which acts at 14 mm radius, giving a resistive torque of 33×14≈460N-mm. This is greater than the turning torque on the bush 301 due to the gear separating forces and therefore the teeth remain fully engaged because the bush 301 does not move.

Because of this inherent self-locking action of the eccentric bush, which is due to the large difference between the outer radius of the bush (14 mm) and its eccentricity (2 mm), the amount of spring tension is not directly relevant to the self-locking behaviour. It can therefore be chosen from consideration of other factors; e.g. how much gear friction torque is acceptable as a result of having the sprung engagement.

Figure 5:
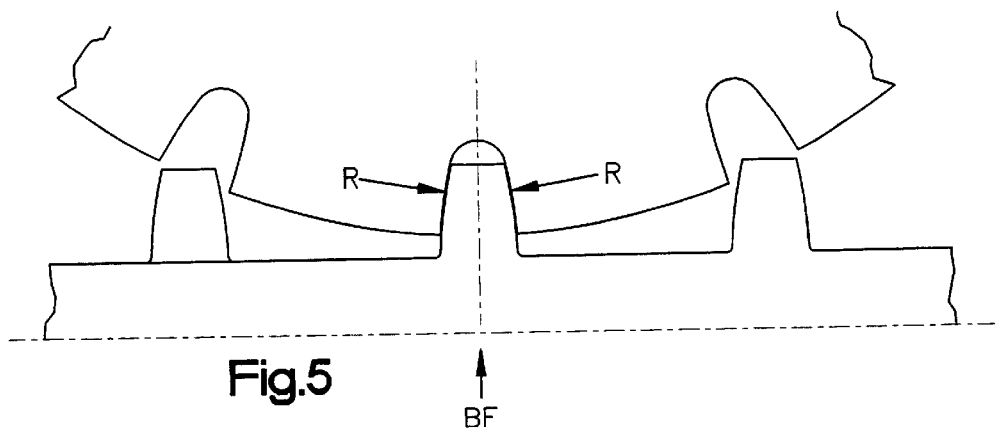
FIG. 5 shows the forces applied between the worm gear and worm wheel due to application or a biasing force generated by an automatic adjustment means such as the one shown in FIG. 3.
Figures 7, 8:
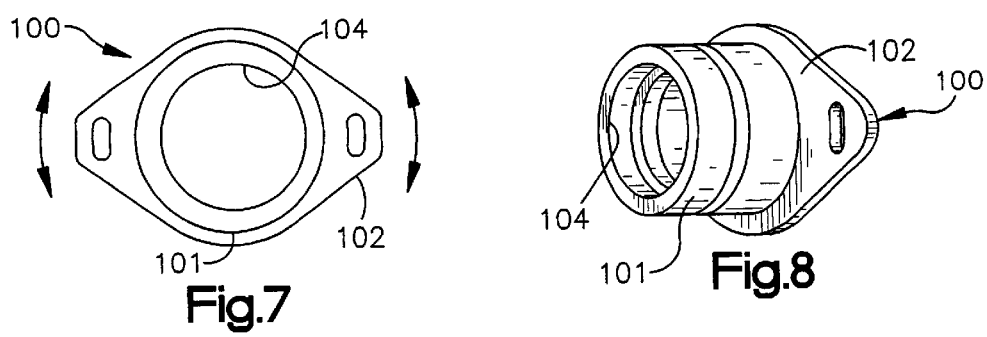
FIG. 7 is an end view of a first support assembly of the steering assembly of FIG. 1.
FIG. 8 is a perspective view of the support assembly of FIG. 7.
Figure 9:
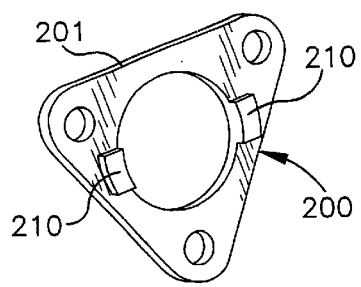
FIG. 9 is a perspective view of a second support assembly of the steering assembly of FIG. 1.
Figure 10:
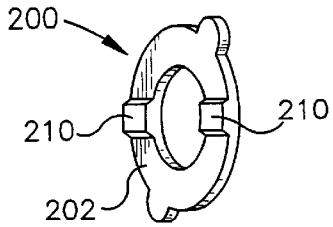
FIG. 10 is a perspective view of an alternative second support assembly of the steering assembly of FIG. 1.

The relationship between the gear meshing (engagement) bias force and the effect on gear friction is explained with the aid of FIG. 5.

Turning now to FIG. 5, if the bias force BF is 100N, then combined flank reaction forces of R will occur at the sides of the tooth where $$R = \frac{100}{\tan°x\cos14°} = 413 \text{ N}$$

The sliding force will be 413×0.05N acting at a worm pitch radius of 7.6 mm, resulting in a worm shaft friction torque of 157 N-mm. As seen at the gear-shaft, this will be equivalent to: 157×16.5/0.86, where 0.86 is the average efficiency of the gearset.

i.e. output side friction torque due to biasing of worm into gear by 100N=3012 N-mm≈3.0N-m If max acceptable friction=0.3N-m, then gear bias force= 10N max Force at bush=5N Torque at bush=5×2=10 N-mm Force in spring required $$\frac{10}{20} \times \frac{1}{0.9^*} = 0.28 \text{ N} \quad ^*\text{allowing for bush friction}$$

This is rather a light spring force.

In a second arrangement shown in FIG. 6, the bush eccentricity X is increased to 3 mm and the lever arm length is reduced to 20 mm, (FIG. 6).

Therefore For gear bias force = 10 N, force at bush = 5 N therefore Torque at bush = 5 × 3 = 15 N-mm therefore Net sprung torque on bush = 15 N-mm If spring force = $T^{11}$, then net torque = $T^{11} \times 20 - T^{11} \times 0.3 \times 14 \approx 16T' = 15$ therefore $T \approx 1$ N To check that effect of gear separating force on 3 mm eccentric bush is still zero movement due to the friction effect Vertical reaction at OD of bush ≈ 105.5 N -continued Turning torque on bush = 3 × 3105.5

= 316.5 N-mm

Resistance to turning ≈ 460 N-mm therefore the Bush still locks.

It will be understood that the present invention relates to apparatus for removing the free play and backlash present between a worm gear and wheel gear in an electric power assisted steering system by providing radial movement of an end of the output shaft. The invention is in no way limited to the exact embodiments described herein, and it is envisaged that several alternatives to the design of the support assemblies which achieve the radial movement of the output shaft will fall within the scope of protection sought.

What is claimed is:

1. An electric power steering system comprising:
    a steering column to which a steering torque is applied by a driver;
    an electric motor to apply an assistance torque to said steering column in response to a measure of the steering torque applied to said steering column by the driver; and
    a housing wherein said electric motor acts on said steering column through a worm gear and a wheel gear,
    said electric motor having a motor output shaft on which said worm gear is provided, said motor output shaft having an end, said wheel gear being provided on a drive shaft wherein a first support assembly and a second support assembly are mounted in said housing and support said motor output shaft at spaced positions,
    said first support assembly including means to allow radial displacement of said end of said motor output shaft relative to said wheel gear, said first support assembly further including a bush having an eccentrically arranged recess and a bearing assembly supported in said recess,
    said second support assembly being adapted to allow angular displacement of said motor output shaft relative to said housing.

2. An electric power steering system according to claim 1 wherein said wheel gear comprises teeth which have a throat radius substantially greater than a throat radius of said worm gear.

3. An electric power steering system according to claim 1 wherein said first support assembly is adapted to support said motor output shaft at said end, said end being furthest from said electric motor.

4. An electric power steering system according to claim 1 wherein said second support assembly supports said motor output shaft at a point between said motor and said worm gear.

5. An electric power steering system according to claim 1 wherein said motor output shaft, said worm gear, and said worm wheel are provided at least partially within said housing.

6. An electric power steering system according to claim 1 wherein said bush is located in a recess in said housing.

7. An electric power steering system according to claim 1 wherein said first support assembly is manually adjustable to facilitate said radial displacement of said motor output shaft.

8. An electric power steering system according to claim 7 wherein said bush incorporates a flange portion secured to said housing.

9. An electric power steering system according to claim 8 wherein said flange portion is secured by at least one fastener which passes through elongate openings in said flange portion.

10. An electric power steering system according to claim 1 wherein said first support assembly is adapted to automatically radially adjust said motor output shaft.

11. An electric power steering system according to claim 10 wherein said first support assembly incorporates automatic adjustment means comprising a compliant member adapted to apply a load between said motor output shaft and said worm wheel through said worm gear.

12. An electric power steering system according to claim 11 wherein said load is of a fixed value.

13. An electric power steering system according to claim 12 wherein said compliant member comprises a spring.

14. An electric power steering system according to claim 12 wherein said compliant member is adapted to exert a force between said housing and said bush to rotate said bush.

15. An electric power steering system according to claim 1 wherein said second support assembly comprises:
    a first plate and a second plate each having a bore therethrough through which said motor output shaft passes; and
    a bearing assembly, each of said plates having a pair of diametrically spaced protrusions facing said bearing assembly such that said bearing assembly is clamped at its central portion by said protrusions.

16. An electric power steering assembly according to claim 15 wherein said bearing assembly is clamped substantially by its central third portion only.

17. An electric power steering system according to claim 15 wherein said protrusions clamp onto an outer race of said bearing assembly.

18. An electric power steering system according to claim 1 wherein said second support assembly allows only angular displacement of said motor output shaft relative to said housing.

19. An electric power steering system according to claim 18 wherein substantially all of the radial displacement of said motor output shaft occurs at said first support assembly.

\* \* \* \* \*